(12) United States Patent
Sun et al.

(10) Patent No.: US 10,240,660 B2
(45) Date of Patent: Mar. 26, 2019

(54) SAFE ASSEMBLY AND INSTALLATION OF A FLYWHEEL

(71) Applicant: Amber Kinetics, Inc., Union City, CA (US)

(72) Inventors: Eric Sun, Union City, CA (US); Daniel Bakholdin, Newbury Park, CA (US); Edward Young Chiao, San Jose, CA (US); Matthew Brandon Garten, Mountain View, CA (US); Mike M. He, San Jose, CA (US); Mark J. Holloway, Mountain View, CA (US); Seth R. Sanders, Berkeley, CA (US); Matthew K. Senesky, Berkeley, CA (US); Alan Michael Sledd, San Francisco, CA (US); Peter Thomas Tennessen, Oakland, CA (US)

(73) Assignee: Amber Kinetics, Inc., Union City, CA (US)

( * ) Notice: Subject to any disclaimer, the term of this patent is extended or adjusted under 35 U.S.C. 154(b) by 0 days.

(21) Appl. No.: 15/191,398

(22) Filed: Jun. 23, 2016

(65) Prior Publication Data

US 2016/0377147 A1   Dec. 29, 2016

Related U.S. Application Data

(60) Provisional application No. 62/185,441, filed on Jun. 26, 2015.

(51) Int. Cl.
*F16C 41/04* (2006.01)
*F16F 15/315* (2006.01)
*F16H 57/00* (2012.01)

(52) U.S. Cl.
CPC ............ *F16F 15/315* (2013.01); *F16C 41/04* (2013.01); *F16H 2057/0093* (2013.01); *Y02E 60/16* (2013.01)

(58) Field of Classification Search
CPC . F16H 2057/0093; F16F 15/315; B65D 61/00
See application file for complete search history.

(56) References Cited

U.S. PATENT DOCUMENTS 3,436,572 A  4/1969 Storsand
3,565,472 A  2/1971 Sjöholm
(Continued)

FOREIGN PATENT DOCUMENTS

DE  2754623 A1 *  6/1979  .......... F16F 15/3153

OTHER PUBLICATIONS

PCT International Search Report and Written Opinion for PCT/US2016/039093, dated Sep. 8, 2016, 16 Pages.

*Primary Examiner* — Vicky A Johnson
(74) *Attorney, Agent, or Firm* — Fenwick & West LLP

(57) ABSTRACT

A flywheel device includes structures allowing the flywheel system to be assembled offsite, transported safely, and installed with relatively few steps. The flywheel includes a rotor and a housing enclosing the rotor, where the housing includes a bottom plate, a top plate and side walls. The bottom plate and the top plate each includes a hole aligned with the center axis of the rotor. The flywheel also includes multiple bearing housings substantially covering the holes of the bottom plate and the top plate that are aligned to the center axis of the rotor. The flywheel also includes posts that physically contact the primary rotational mass of the rotor to prevent motion of the rotor during transport of the flywheel system. Some or all of these posts may be repositioned or removed during installation so that the rotor can spin freely.

14 Claims, 9 Drawing Sheets

(56) References Cited

U.S. PATENT DOCUMENTS

| | | | | |
|---|---|---|---|---|
| 5,480,026 A * | 1/1996 | Darling | .................. | A63B 47/00 |
| | | | | 206/315.9 |
| 5,553,707 A * | 9/1996 | Lion | ........................ | A45F 5/00 |
| | | | | 206/315.9 |
| 5,695,056 A * | 12/1997 | Bender | .................. | B65D 85/00 |
| | | | | 206/315.2 |
| 6,029,538 A | 2/2000 | Little et al. | | |
| 6,064,121 A | 5/2000 | Shervington et al. | | |
| 6,794,776 B1 * | 9/2004 | Gabrys | .................. | H02K 7/025 |
| | | | | 310/209 |
| 7,048,118 B2 * | 5/2006 | Baechle | .................. | B65D 61/00 |
| | | | | 206/320 |
| 2005/0050982 A1 * | 3/2005 | Shimada | .................. | F16F 15/30 |
| | | | | 74/572.11 |
| 2005/0061920 A1 * | 3/2005 | Brault | .................... | B64G 1/283 |
| | | | | 244/165 |
| 2010/0283340 A1 * | 11/2010 | Fradella | .................. | H02K 7/025 |
| | | | | 310/74 |
| 2014/0055905 A1 * | 2/2014 | Sanders | .................. | H01F 7/206 |
| | | | | 361/144 |
| 2014/0125171 A1 * | 5/2014 | Bremer | .................. | H02K 7/025 |
| | | | | 310/74 |
| 2014/0210424 A1 * | 7/2014 | Schroeder | ................. | H02P 3/04 |
| | | | | 322/4 |
| 2015/0008778 A1 * | 1/2015 | Dharan | .................. | H02K 7/025 |
| | | | | 310/74 |
| 2016/0377147 A1 * | 12/2016 | Sun | ....................... | F16F 15/315 |
| | | | | 74/572.1 |

* cited by examiner

US 10,240,660 B2

SAFE ASSEMBLY AND INSTALLATION OF A FLYWHEEL

CROSS REFERENCE TO RELATED APPLICATIONS

This application claims the benefit of U.S. Provisional Application No. 62/185,441, filed Jun. 26, 2015, which is incorporated by reference in its entirety. This application is related to co-pending U.S. application Ser. No. 13/973,937 filed on Aug. 22, 2013, Ser. No. 14/469,382, filed on Aug. 26, 2014, and Ser. No. 14/811,012, filed on Jul. 28, 2015, which are hereby incorporated by reference in their entirety.

GOVERNMENT RIGHTS LEGEND

This invention was made with government support under contract OE-0003232 awarded by the U.S. Department of Energy. The government has certain rights in the invention.

TECHNICAL FIELD

This description generally relates to energy storage, and particularly to the assembly, transportation and installation of a flywheel.

BACKGROUND

Description of the Related Art

Many energy sources, particularly clean energy sources such as wind turbines and solar panels, generate energy that does not temporally match the load experienced. In much of the developed world, energy generation follows experienced load, such that energy is provided as needed. Under circumstances of high load, techniques such as the use of peaker generators and automatic generation control (AGC) on thermal generators allow for generation that matches high and variable load. However, despite the availability of such techniques, there are often instances where energy storage is important for meeting energy load.

Currently existing energy storage systems all have drawbacks of one form of another. Size, price, storage efficiency, efficacy, and safety are all concerns when designing an energy storage system. Generally, smaller size, lower price, reduced loss in both inputting energy for storage and extracting it for distribution, reduced losses for continuous operation, and safe disposal are all preferred characteristics of energy storage systems.

A flywheel mechanism that incorporates a rotor is one type of energy storage system that stores energy as rotational kinetic energy. A flywheel rotor is a weighted, rotationally symmetric mass that spins while physically coupled, directly or indirectly, to a motor/alternator that itself is electrically coupled to a converter, such as a back-to-back inverter system, constituting an AC-AC conversion subsystem. When power is received for storage, the rotor is driven increasing the rotational speed of the flywheel rotor. When power is to be extracted, the flywheel rotor drives the motor/alternator. The faster a flywheel rotor can spin, the more energy it can store. The amount of energy that can be stored in a flywheel rotor depends on a combination of the rotor's mass, strength properties, cyclic fatigue properties, and shape among other factors. Generally, a flywheel's bearing and suspension subsystem is designed to minimized energy losses due to friction, heat, and other loss sources.

Modern flywheel systems are heavy, complex machines that include several delicate and carefully aligned components. Assembling, transporting, and/or installing a flywheel system is a nontrivial task. Generally, the flywheel system may be assembled at the installation site, or assembled in a factory and then transported to the installation site.

If the flywheel system is assembled at the installation site, the equipment and expertise necessary for assembling the flywheel system would need to be transported to the installation site. This can be cost and space prohibitive. If the flywheel system is assembled in a factory, the assembled flywheel system would need to be transported to the installation site. Transportation of an assembled flywheel system poses risks to the assembled system as the internal components of a flywheel system may move around during transport. For instance, the flywheel rotor may shake and hit other components, damaging the rotor or the other components. In addition, motion of the rotor may cause the load experienced by the rotor's bearings to be larger than weight of the rotor. This may potentially damage the bearings.

Thus, it is with respect to these considerations and others that the present invention has been made.

SUMMARY

A flywheel device includes a flywheel rotor for storing energy, as well as additional structures allowing the flywheel to be assembled offsite, transported safely, and installed with relatively few steps. The flywheel includes a rotor for storing energy, where the rotor includes a primary rotational mass and journals extending along a center axis of the rotor. The flywheel also includes a housing enclosing the rotor, where the housing includes a bottom plate, a top plate and side walls. The bottom plate and the top plate each include a hole aligned with the center axis of the rotor. The flywheel additionally includes multiple bearing housings substantially filling the holes of the bottom plate and the top plate that are aligned to the center axis of the rotor. The flywheel also includes multiple posts that are capable of physically contacting the primary rotational mass of the rotor to prevent motion of the rotor during transport of the flywheel assembly. Some or all of these posts may be repositioned or removed during installation so that the rotor can spin freely.

Other aspects of the invention include methods for assembling and installing the flywheel before and after transportation as described herein.

In certain embodiments, the flywheel includes an upper bearing assembly that enables an upper bearing to support downward thrust. The upper bearing assembly includes a top bearing, a bearing housing, a bearing locking cap, a backup thrust bearing, and a cap. The backup thrust bearing receives an upward thrust load in the case of an unusual vertical movement

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a block diagram of a flywheel energy storage system according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Flywheel Energy Storage System

Figure 1:
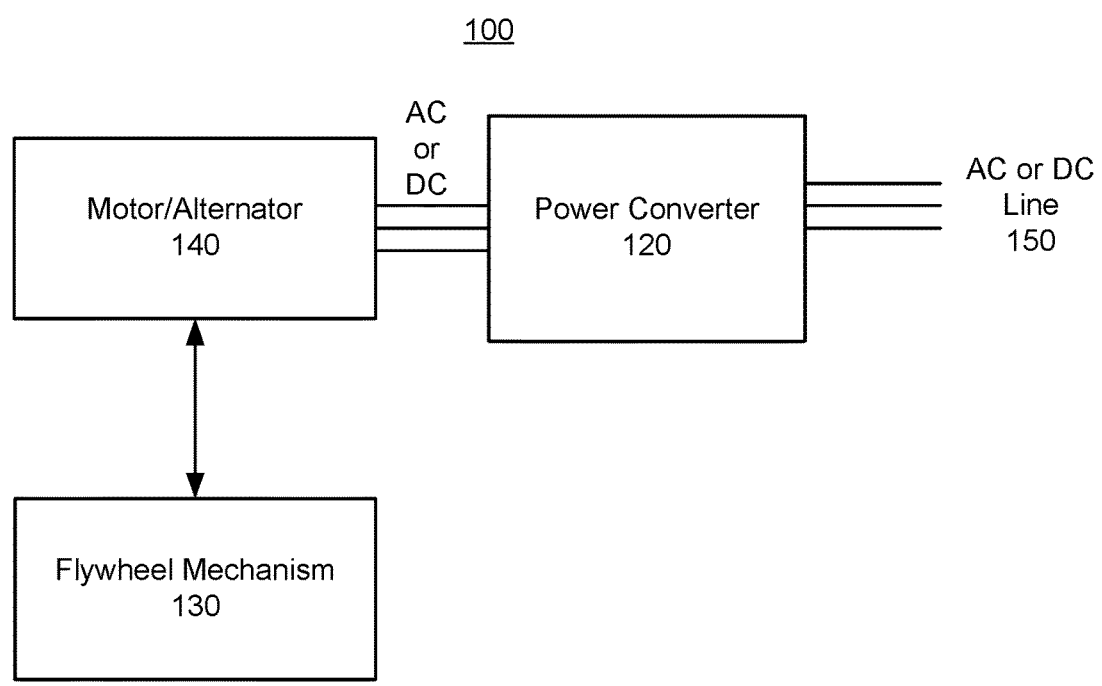

Figure (FIG. 1 is a block diagram of a flywheel energy storage system 100, also referred to as flywheel system 100, according to one embodiment. Flywheel system 100 includes a flywheel mechanism or device 130 or simply flywheel 130, which includes a rotor and a housing as discussed hereinbelow, a motor/alternator 140, a power converter 120, and a power line 150, which may be AC or DC. For example, power line 150 may be a conventional three-phase 60 Hz AC line. In certain embodiments, power converter 120 converts the input alternating current into an alternating current acceptable to the motor/alternator 140. Alternatively, in other embodiments, converter 120 converts the alternating current from the motor/alternator 140 into a direct current output. Motor/alternator 140 converts between electrical and mechanical energy, so that energy can be stored in or drawn from the flywheel 130. Motor/alternator 140 couples to flywheel 130 either directly, for example using a shaft, or indirectly, for example using a stub shaft that connects to a bearing. The motor/alternator 140 is coupled to the remainder of flywheel system 100 via wires or other electrical couplings. Generally, although only one of each component is shown, in practice flywheel system 100 may include multiples of each individual component.

Flywheel Structure

Figure 2A:
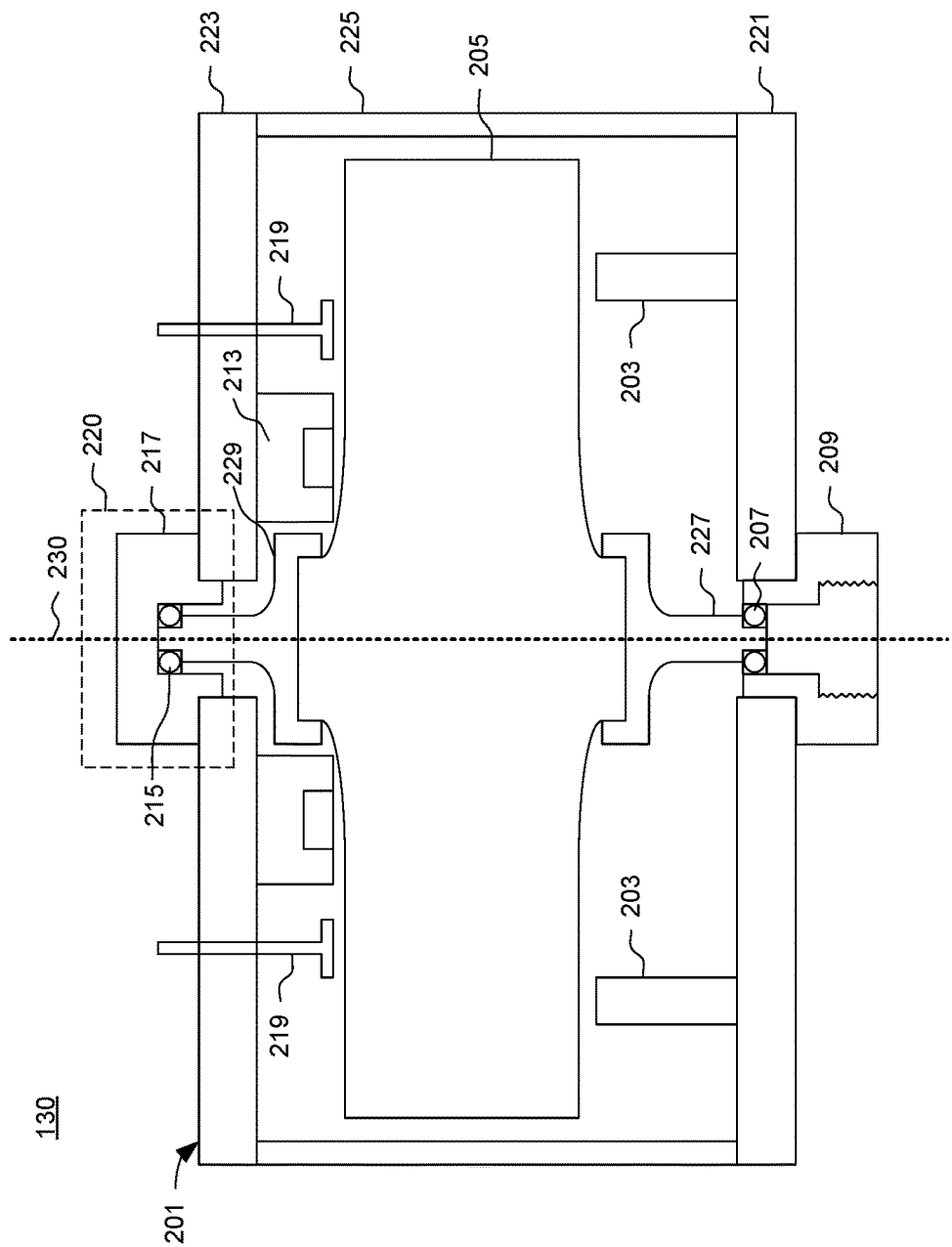
FIG. 2A is a cross sectional view of a flywheel in its operational state, according to one embodiment.

FIG. 2A is a cross sectional view of a flywheel 130 in its operational state, according to one embodiment. That is, flywheel 130 of FIG. 2A is shown after the assembly and installation process has been completed.

Flywheel 130 includes a rotor 205 inside a housing 201. Housing 201 includes a bottom plate 221, a top plate 223 and side walls 225. Housing 201 is generally shaped to house rotor 205, providing sufficient internal volume to allow rotor 205 to rotate freely. Housing 201 may be cylindrical in shape, though other shapes are possible. Top plate 223 and bottom plate 221 each include at least one hole that is aligned with the central rotational axis 230. Each of the holes aligned with central rotational axis 230 is substantially filled by a bearing housing. A lower bearing housing 209 houses lower bearing 207 and an upper bearing housing 217 houses upper bearing 215. An upper bearing assembly 220 refers to upper bearing housing 217 together with upper bearing 215. An alternative embodiment of an upper bearing assembly is described hereinbelow with reference to FIG. 7.

Rotor 205 is used for storing energy as kinetic energy. Rotor 205 is substantially rotationally symmetric around a central rotational axis 230. The shape of the primary rotational mass of the rotor helps ensure a nearly uniform distribution of stress due to rotational forces exerted on the rotor while it is rotating. Rotor 205 is coupled to two stub shafts, a lower stub shaft 227 and an upper stub shaft 229, which couple the rotor to bearings that support the rotor, while allowing for unconstrained rotation about the central axis. The electromagnetic rotor of a motor/alternator may also be installed on one, or both, of the stub shafts. The purpose of the motor/alternator is to transfer energy between rotor 205 and the electrical domain. As used herein, the term stub shaft refers to a relatively short shaft that couples to one side of rotor 205. While the embodiment illustrated in FIGS. 2A-2B employs two stub-shafts, in other embodiments a single stub shaft, or two stub shafts may be used. Stub shafts 227 and 229 couple to rotor 205 via journals that extend along the center rotational axis of the rotor.

Rotor 205 is held in place within the housing 201 by a lower bearing 207 and an upper bearing 215. Bearings 207, 215 also allow rotor 205 to spin freely with as little friction as possible. For instance, rolling ball bearings may be used. In this case, the bearing includes an outer ring (or race) that is physically attached to the flywheel housing 201, an inner ring (or race) that is physically attached to the shaft coupled to the rotor, and multiple rolling elements, such as balls, that allow the inner ring to spin relative to the outer ring with a low coefficient of friction. The bearings are confined within their respective bearing housing, and the shafts are confined within the inner race of the bearings.

To reduce the amount of friction experienced by rotor 205, flywheel system 130 includes an offloader 213 that offloads some or all of the weight of the rotor 205. Consequently, offloader 213 reduces the load of the bearing 207, and consequently reduces the friction moment of the bearing. As such, the energy loss by the rotor due to the friction of the bearing is substantially reduced. The offloader 213 reduces the weight the rotor bearing 207 has to support by generating a magnetic field that attracts or repulses the rotor 205, depending upon the implementation. The magnetic field may be generated through circulation of an appropriately shaped current in an electromagnet, for example. The magnetic force experienced by the rotor 205 depends in part on the distance between the electromagnet in offloader 213 and the rotor 205. Thus, it is advantageous to have only a small distance between the electromagnet and the rotor 205. However, decreasing the distance between the offloader and the rotor increases the likelihood of the rotor striking the offloader, particularly during transport.

Flywheel mechanism 130 may be assembled prior to transport to an installation site. To prevent motion of the rotor 205, damage to the bearings 207, 215, and damage to the offloader 213, flywheel mechanism 130 includes one or more of posts 203, 219 that restrict the motion of the rotor during transport. The posts further allow offloader 213 and rotor 205 to be placed in very close proximity without significant risk to damage to either element. Further, due to the closer placement of the offloader 213, the electromagnet in the offloader 213 can be smaller or more power efficient than it would be if it were located further away, while still producing the same effective magnetic field upon the rotor. For purposes of this specification the term post refers to a structural element that restricts movement of a rotor in one direction. In certain embodiments, only bottom posts 203 or top posts 219 are present while in other embodiments both posts 203 and 219 are present. In other embodiments, there may be also be horizontal posts (not depicted) that are anchored by sidewalls 225.

Figure 2B:
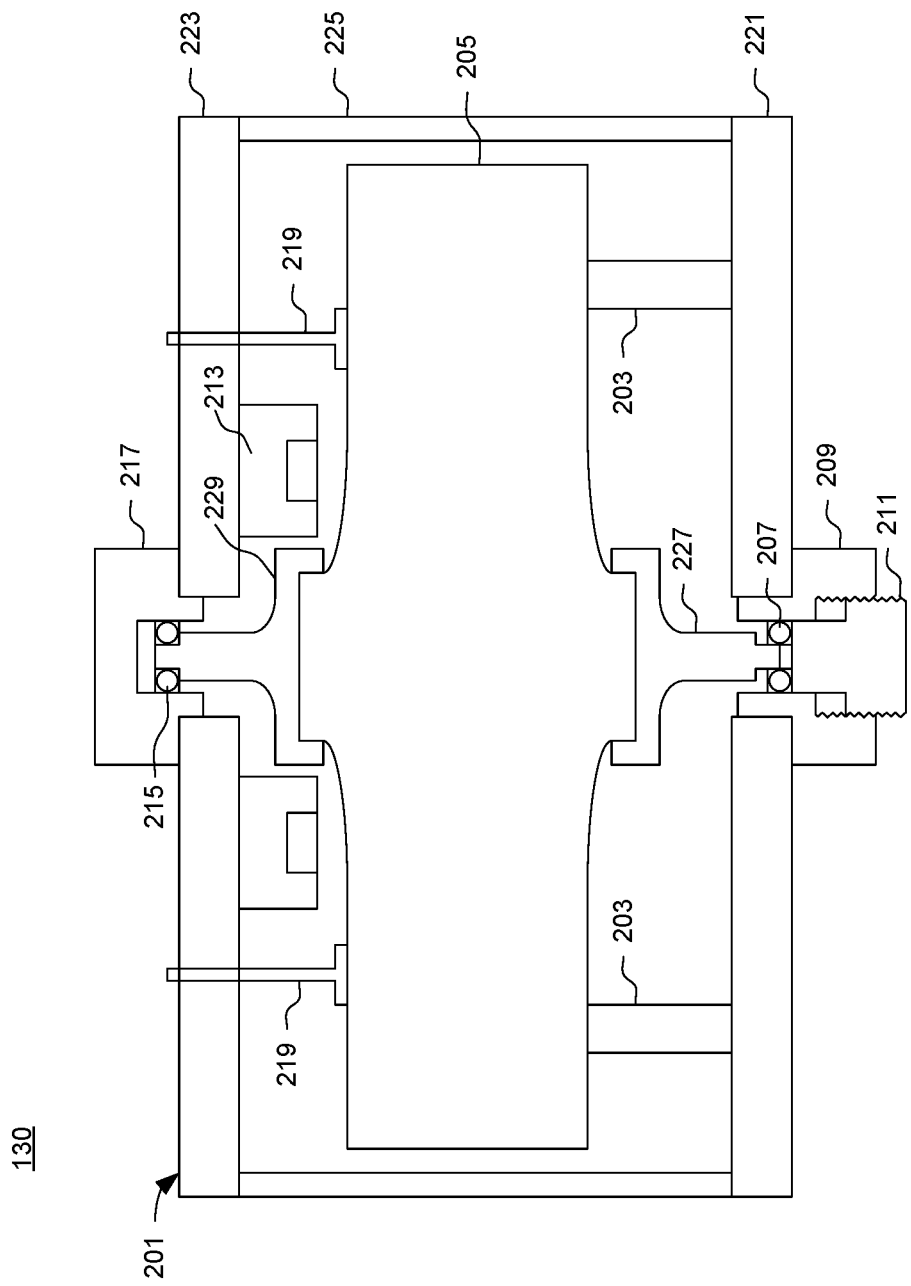
FIG. 2B is a cross sectional view of a flywheel during transport, according to one embodiment.

FIG. 2B is a cross sectional view of flywheel 130 during transport, according to one embodiment. As seen in FIG. 2B, bottom posts 203 contact rotor 205, thus restricting the downward motion of the rotor. Similarly, top posts 219 contact rotor 205, thus restricting the upward motion of the rotor. The posts and bearings together restrict the lateral motion of the rotor. As illustrated in FIG. 2B, bottom posts 203 may be physically attached to (or a part of) bottom plate 221 of the housing 201, and top posts 219 may be removable (or at least adjustable) from the top plate 223 through holes in the top plate (not separately labeled). In other implementations, the top and bottom posts may be reversed such that the movable posts are on bottom and the attached posts are on top. Alternatively, both sets of posts may be movable. The posts may be made of any material, although materials that are strong and light weight are preferable. For example, the posts may be made of inter alfa aluminum, rubber, or plastic.

During installation of flywheel 130, top posts 219 are removed or raised up a distance, and rotor 205 is raised off of bottom posts 203 to allow rotor 205 to spin freely. In one embodiment, a backing plug 211, which is threadably attached to lower bearing housing 209, may be used to raise rotor 205.

Flywheel Assembly Process

Figure 3:
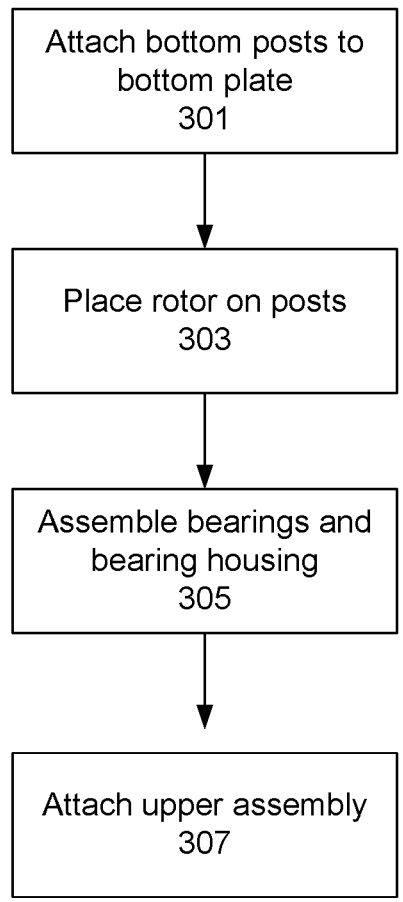
FIG. 3 is an exemplary process for assembling and installing a flywheel, according to one embodiment.

FIG. 3 is a flow diagram of a process 300 for assembling flywheel 130. FIGS. 4A through 4D illustrate flywheel 130 at different stages of assembly.

Assembly process 300 starts with the bottom plate 221 of the housing 201. At step 301, illustrated in FIG. 4A, bottom posts 203 are attached to the bottom plate 221. For instance, the bottom posts 203 are bolted to the bottom plate 221. Alternatively, other techniques, such as riveting, welding, or bonding may be used to physically attach the bottom posts 203 to the bottom plate 221. If the bottom posts 203 are movable, the bottom posts 203 are threaded into a hole of the bottom plate 221.

Figure 4A:
FIGS. 4A through 4D are cross sectional views of the flywheel at different stages of the assembly and installation process, according to one embodiment.
Figure 4B:
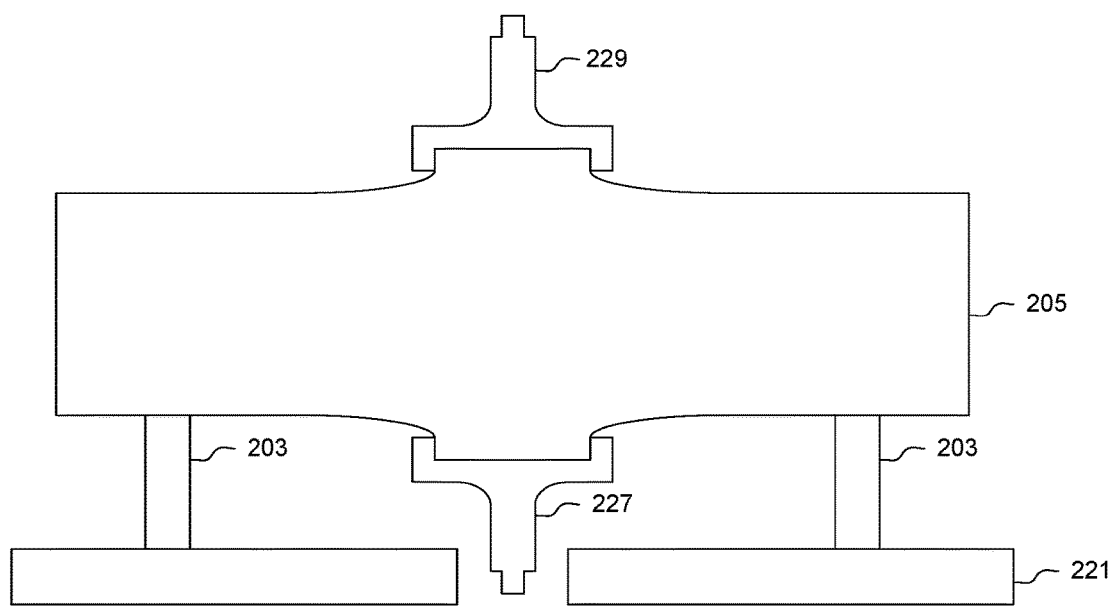

At step 303, illustrated in FIG. 4B, rotor 205 is placed on bottom posts 203. Given that the rotor may have a weight between 2-5 tons, cranes or other large-scale lifting mechanisms are generally used to move the rotor onto the bottom posts. As the rotor is designed with stress and storage capacity concerns in mind, generally there are no explicit surface features on the rotor to ensure proper placement of the rotor relative to the posts. However, the rotor's general shape may be used to determine placement of the posts within housing 201. For example, if a cylindrical rotor has a curved shaped along a polar axis, then the curvature of the rotor may be used to place the posts at a location along the polar axis where they are least likely to slip.

To further effect proper placement of the rotor, once placed on the posts the rotor may be repositioned using a coarse alignment process to properly align with the posts.

In certain embodiments, as illustrated in FIG. 4B, rotor 205 may already be coupled to stub shafts 227 and 229 when the rotor is placed on the posts. In other embodiments, coupling stub shafts 227 and 229 to rotor 205 is performed as part of step 303.

Figure 4C:
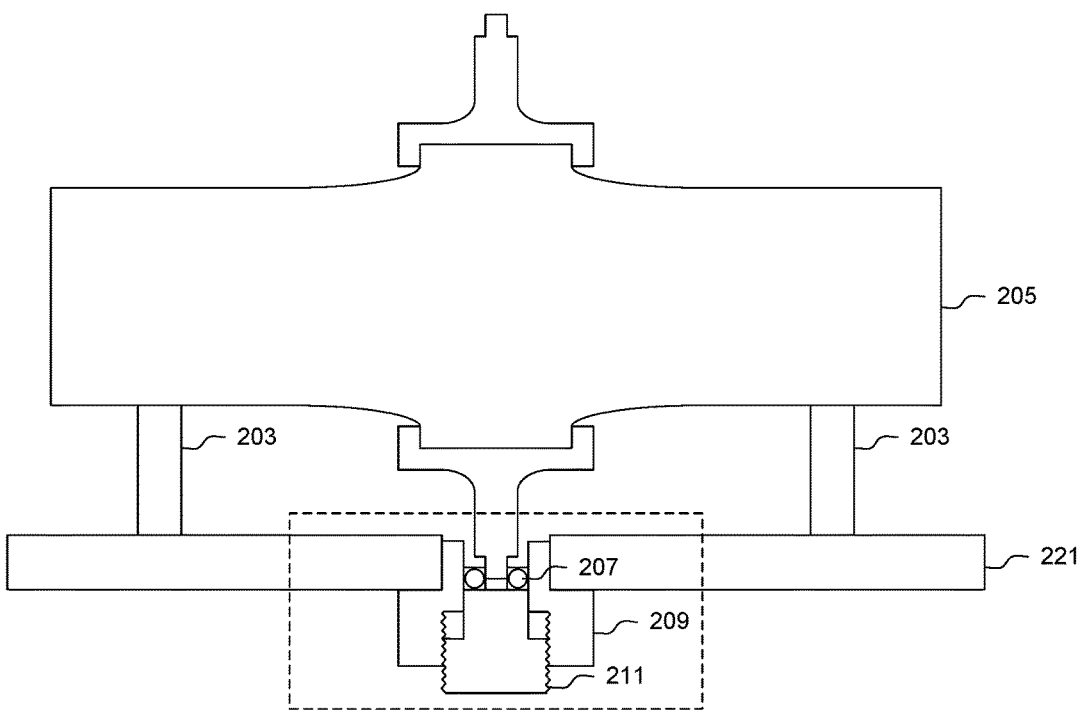

At step 305, illustrated in FIG. 4C, lower bearing 207, lower bearing housing 209 and backing plug 211 are physically attached to housing 201. For instance, lower bearing housing 209 is bolted to bottom plate 221. Alternatively, other techniques, such as riveting, welding, or bonding may be used to physically attach lower bearing housing 209 to bottom plate 221. Lower bearing 207 is then inserted into lower bearing housing 209, and backing plug 211 is attached to lower bearing housing 209. Lower bearing 207 is supported by backing plug 211 and backing plug 211 is threadably attached to lower bearing housing 209.

Figure 4D:
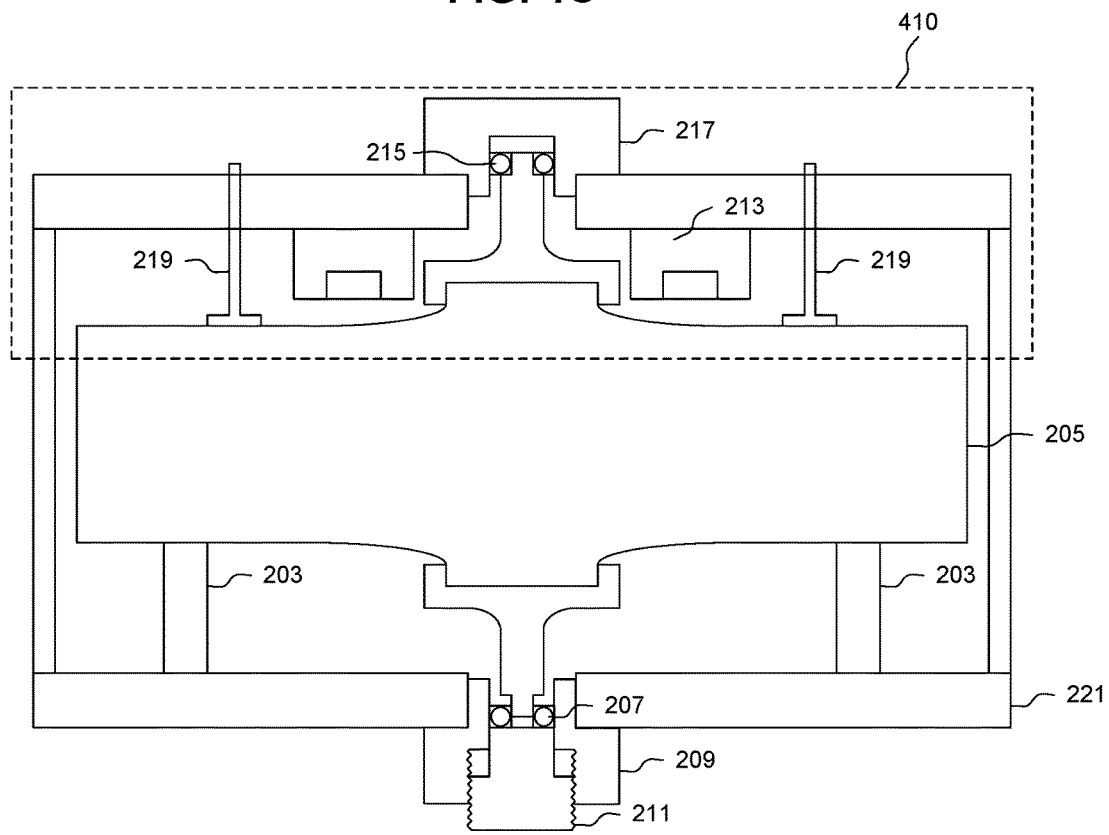

At step 307, illustrated in FIG. 4D, an upper assembly 410, including upper bearing 215, upper bearing housing 217, upper posts 219, electromagnetic offloader 213, top plate 223, and side walls 225 of housing 201, is physically attached to the partially assembled flywheel illustrated in FIG. 4C. It may be appreciated that rotor 205 is cylindrical and thus in certain embodiments housing 201 is cylindrical in shape. In such embodiments side walls 225 may be a one-piece cylindrical shell. Generally side walls 225 may be a single element or may be multiple attached elements which together form the sides of flywheel 130. To assemble the upper sub-assembly, the upper bearing housing 217 is physically attached to the top plate 223 and the upper bearing 215 is inserted into the upper bearing housing 217. Further, the offloader 213 is physically attached to top plate 223, and the upper posts 219 are threaded into the top plate 223. Once the upper sub-assembly has been put together, the side walls 225 are physically attached to the bottom plate 221 and the top plate 223 is physically attached to the side walls 225.

Different physical couplings may be used to attach the bottom plate 221, the side walls 225 and the top plate 223 of the housing 201. The bottom plate 221, side walls 225 and top plate 223 may be attached together using screws and/or rivets, welds, or any other known mechanism for physical attachment.

To securely hold the rotor 205 in place during transport, the upper posts 219 are lowered into physical contact with the rotor. To secure the rotor, the upper posts may be pressed against the rotor, for example by tightening screws under an applied torque.

Flywheel Installation Process

Figure 5:
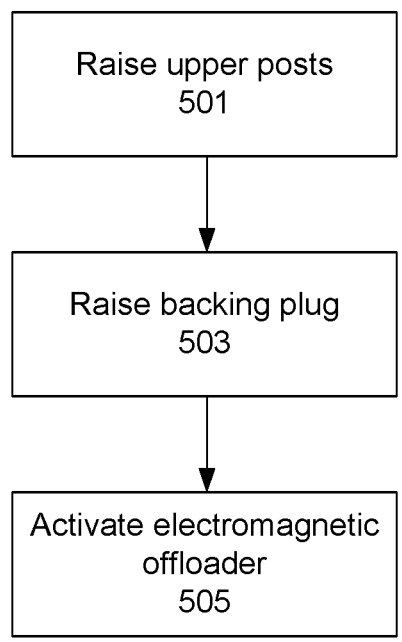
FIG. 5 is an exemplary process for installing a flywheel, according to one embodiment.
Figure 6A:
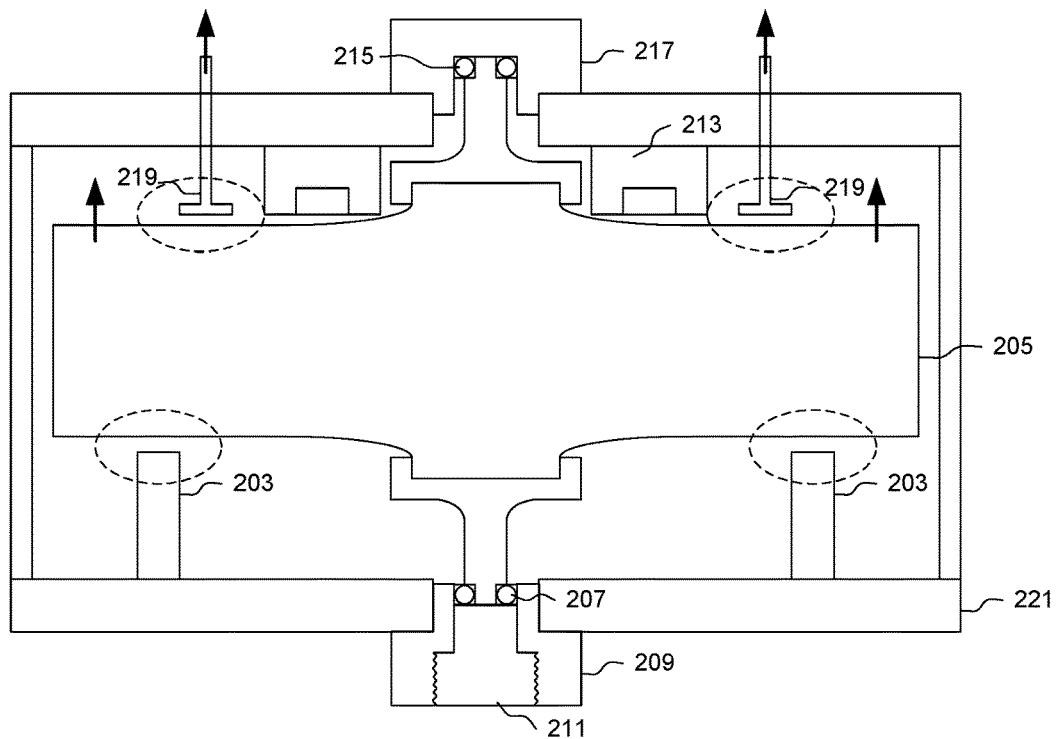
FIGS. 6A through 6B are cross sectional views of the flywheel at different stages of the installation process, according to one embodiment.
Figure 6B:
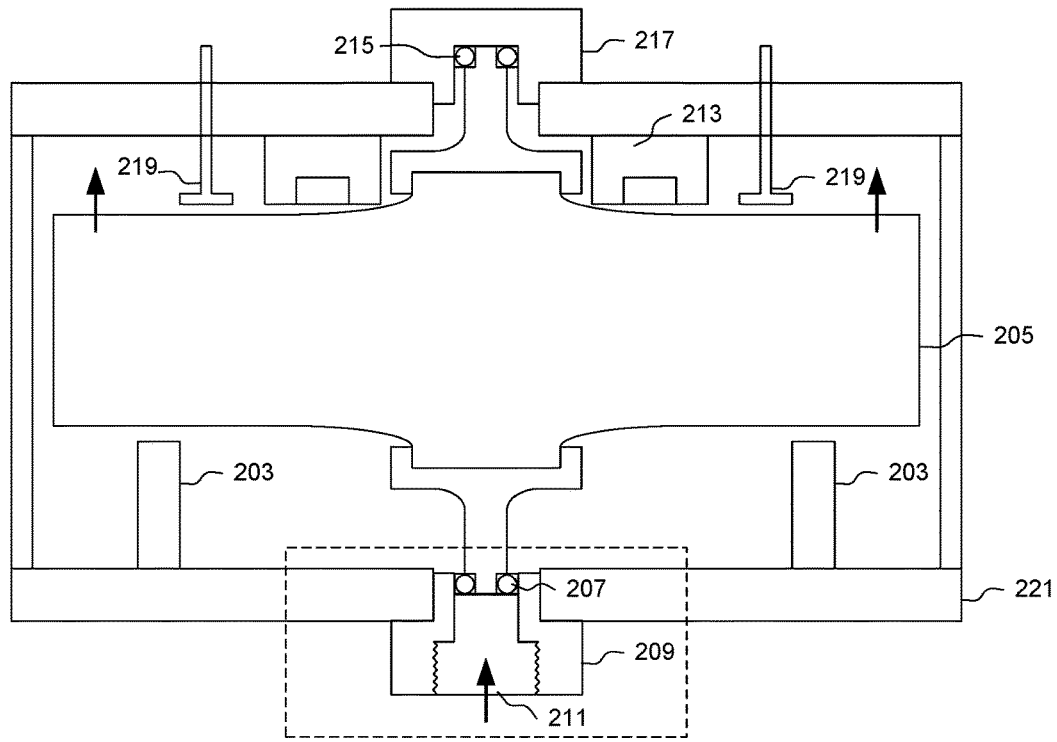

FIG. 5 is a flow diagram of a process 500 for installing flywheel 130 once it arrives at an installation site. Essentially, these are the steps that are performed to put flywheel 130 into operation. FIGS. 6A-6B illustrate certain steps of process 500 for installing flywheel 130.

At step 501, illustrated in FIG. 6A, top posts 210 are raised off rotor 205 so that they are no longer in physical contact with the rotor 205.

In one embodiment, shown in step 503 and illustrated in FIG. 6B, rotor 205 is then raised off of bottom posts 203 by raising backing plug 211. For example, if backing plug 211 is attached using threads, threading the backing plug into the lower bearing housing 209 will raise the lower bearings 207, thereby raising the rotor 205. In other embodiments, those where bottom posts 203 are removable or at least repositionable, rather than raising rotor 205 off of bottom posts 203, the bottom posts 203 may instead be partially or fully removed to no longer contact rotor 205. The physical distance between the rotor 205 and top 219 and bottom 203 posts after these processes are completed may vary by implementation.

At step 503, electromagnetic offloader 213 is then activated to de-weight the bearings. Additionally, if the housing is capable of holding a vacuum, the vacuum may be created by activation of associated vacuum machinery (not shown).

Flipped-Bearing Design

Figure 7:
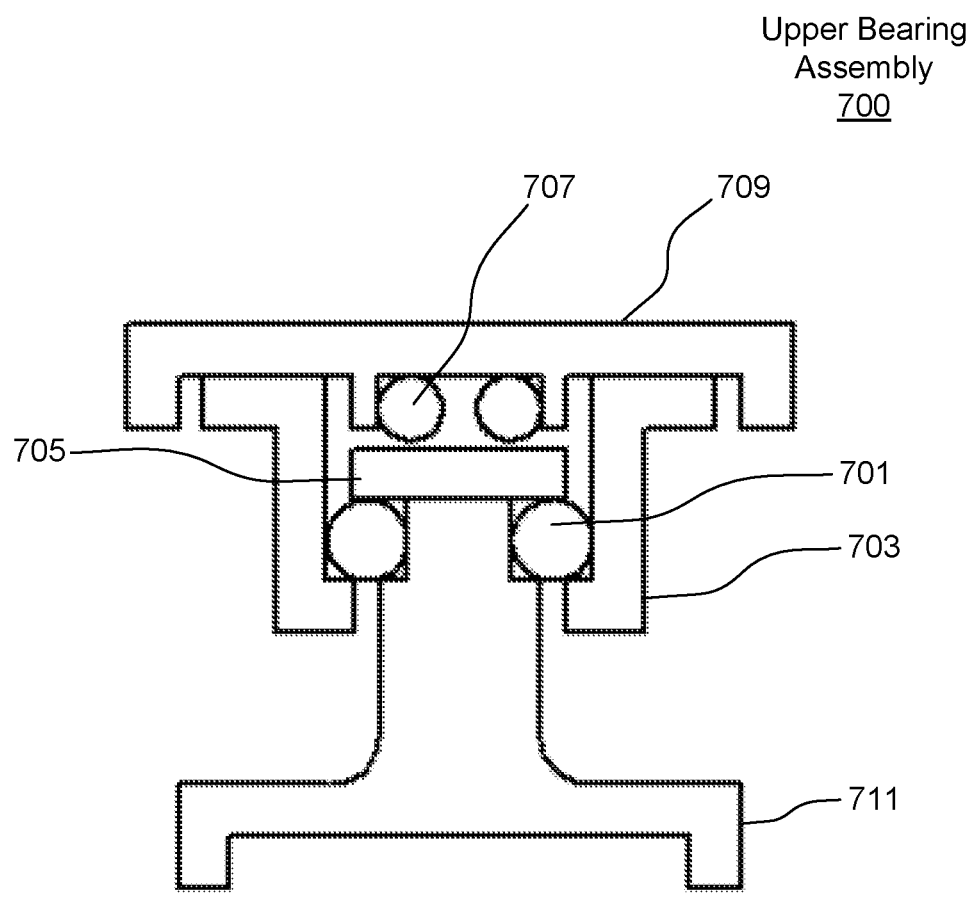
FIG. 7 is a simplified cross sectional view of an embodiment of an upper bearing assembly, referred to as a flipped-bearing design.

FIG. 7 is a simplified cross-sectional view of an embodiment of an upper bearing assembly 700, referred to as a flipped-bearing design. Upper bearing assembly 700 differs from upper bearing assembly 220 described with reference to FIG. 2A in that a top bearing 701 supports downward thrust load, as does the lower bearing, rather than upward thrust load thrust. While top bearing 701 may be the same bearing as top bearing 215 of FIG. 2A, it is supported differently due to the unique flipped-bearing design. As previously noted flywheel 130 may include an upper bearing assembly such as upper bearing assembly 220, upper bearing assembly 700 with a flipped-bearing design or an upper bearing assembly of a different design without departing from the scope and spirit of the subject invention.

Upper bearing assembly 700 includes top bearing 701, a bearing housing 703, a bearing locking cap 705, a backup thrust bearing 707, and a cap 709.

Bearing locking cap 705 fits and holds top bearing 701 onto a shaft or stub shaft 711. In this embodiment, bearing housing 703 supports top bearing 701 from below.

A backup thrust bearing 707 is situated between bearing locking cap 705 and cap 709. This is referred to as a backup bearing since in normal operation it does not spin. Backup thrust bearing 707 absorbs or diffuses upwards vertical thrust from stub shaft 711 that might otherwise result in damage or containment issues by converting the upwards thrust into rotational energy. Such an unusual vertical movement might occur, for example, due to an accident during transportation or as a result of a seismic event. While during transportation the rotor is not rotating, if a seismic event or other event occurs during operation of the flywheel then rotor 205 will most likely be spinning; thus a backup bearing rather than simply a bushing material is advantageous to absorb or diffuse the large rotational energy of the rotor. If the spinning rotor were to contact a static bushing made of conventional engineering plastic or metal, the resulting friction that would likely melt the bushing, even if the contact was only momentary.

A wide variety of embodiments may feature the flipped-bearing design. In certain embodiments, top bearing 701 as well as bottom bearing 207 in flywheel 130 are angular contact ball bearings that provide high thrust capacity in one direction. Typically angular contact ball bearings have raceways in the inner and outer rings that are displaced relative to each other in the direction of the bearing axis. This means that they are designed to accommodate simultaneous radial and axial loads. In such embodiments, the top bearing 701 and the bottom bearing are mounted so as to provide high thrust capacity in the downward direction. In flywheel embodiments that don't use the flipped-bearing design, top bearing 701 supports thrust in the upward direction while bottom bearing 207 supports downward thrust, i.e. they are flipped with respect to each other.

Flywheel embodiments that incorporate the flipped-bearing design offer a number of advantages relative to the simpler design described with reference to FIGS. 2A-2B. Since both bearings face downward, i.e. in the same direction, in the flipped design, it is possible, through the use of springs supporting the lower bearing, to allow for all differential rotor-housing axial dimension growth to be accommodated at the lower bearing seat. As such, the dimension of the magnetic gap at the offloader is nearly invariant under differential dimensional changes between housing and rotor. Loading on the upper bearing is set and controlled by the magnetic offloading control system. Since loading on the lower bearing can be fully controlled by an axial preload spring, it is straightforward to ensure that the lower bearing will have excellent fatigue life under all operating conditions. So even if the flywheel requires its bearings to be serviced that service will only involve top bearing 701 which can be accessed from the top without having to disconnect and remove the flywheel.

The flipped-bearing design also reduces the required offloader lifting force. For example, if, top bearing assembly 220 the offloader had to apply rotor weight +1000 lb, using the flipped-bearing design it applies rotor weight −1000 lb. This makes control of the electromagnet in offloader 213 easier and potentially reduces its power consumption and size.

Damage to the bearings due to unusual movements will be more likely to impact or damage the relatively cheaper, easier to replace backup bearing 707 rather than the relatively more expensive main bearings, i.e. top bearing 701 and the bottom bearing.

Additional Configuration Considerations

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A flywheel device, comprising:
   a rotor for storing energy, the rotor comprising a primary rotational mass having a top surface and a bottom surface;
   a shaft coupled to the rotor, the primary rotational mass of the rotor configured to rotate around a central axis of the shaft;
   a housing enclosing the rotor, the housing including a top plate, a bottom plate, and a side wall, the housing defining a hole aligned with the central axis of the shaft;
   a bearing housing substantially filling the hole aligned with the center axis of the rotor, the bearing housing including a bearing coupled to the shaft;
   a plurality of posts configured to physically contact the bottom surface of the primary rotational mass of the rotor during transport of the flywheel assembly to prevent motion of the rotor during transport of the flywheel assembly, the plurality of posts fixedly attached to the housing; and
   a lifting mechanism configured to lift the bearing housing during installation, from a transport position at which the rotor rests on the plurality of posts, such that the rotor is lifted off the plurality of posts enabling the primary rotational mass to rotate around the central axis.

2. The flywheel device of claim 1, wherein the primary rotational mass extends outward along a polar axis away from the center rotational axis.

3. The flywheel device of claim 1, wherein the shaft coupled to the rotor is a stub shaft, and wherein the rotor has a journal that couples to the stub shaft.

4. The flywheel device of claim 1, further comprising a second plurality of posts configured to physically contact the top surface of the rotor during transport of the flywheel assembly to prevent motion of the rotor during transport of the flywheel assembly, wherein the second plurality of posts are further configured to be raised up or removed during installation to enable the primary rotational mass to rotate around the central axis.

5. The flywheel device of claim 1, wherein the plurality of posts are attached to the bottom plate.

6. The flywheel device of claim 1, wherein the lifting mechanism comprises a backing plug.

7. The flywheel device of claim 1, wherein the housing is hermetically sealed to allow a vacuum to be created inside the housing.

8. The flywheel device of claim 1, wherein the rotor is made of a ferromagnetic material and further comprising:
   a magnetic offloader attached to the one of the plates, which produces an electromagnetic field that reduces a load of the rotor on the bearing.

9. The flywheel device of claim 8, wherein the magnetic offloader is attached to the top plate of the housing.

10. The flywheel device of claim 1, wherein the bearing housing is a bottom bearing housing disposed below the rotor.

11. The flywheel device of claim 10, further comprising an upper bearing assembly, wherein the upper bearing assembly comprises:
   an upper bearing housing that substantially fills a hole in the top plate that aligns with the central vertical axis of the rotor;
   a top bearing that couples with a top shaft, the top shaft coupled with the rotor; and
   a bearing locking cap above the top bearing that holds the top bearing onto the top shaft and which rests on the top bearing, thus exerting a downward thrust load onto the top bearing during operation of the flywheel.

12. The flywheel device of claim 11, wherein the top bearing is an angular contact bearing and is configured to oppose a force exerted in a downward direction.

13. The flywheel device of claim 11, wherein the upper bearing assembly further comprises:
   a backup thrust bearing, above the bearing locking cap for absorbing an upward thrust load in the case of an unusual vertical movement; and
   a cap, above the backup thrust bearing, that seals the top of the upper bearing assembly.

14. The flywheel device of claim 1, wherein the lifting mechanism is threadably attached to the bearing housing.

\* \* \* \* \*